April 18, 1944. M. PENNYBACKER ET AL 2,347,156
LEER FOR TUBING
Filed July 17, 1941 2 Sheets-Sheet 1
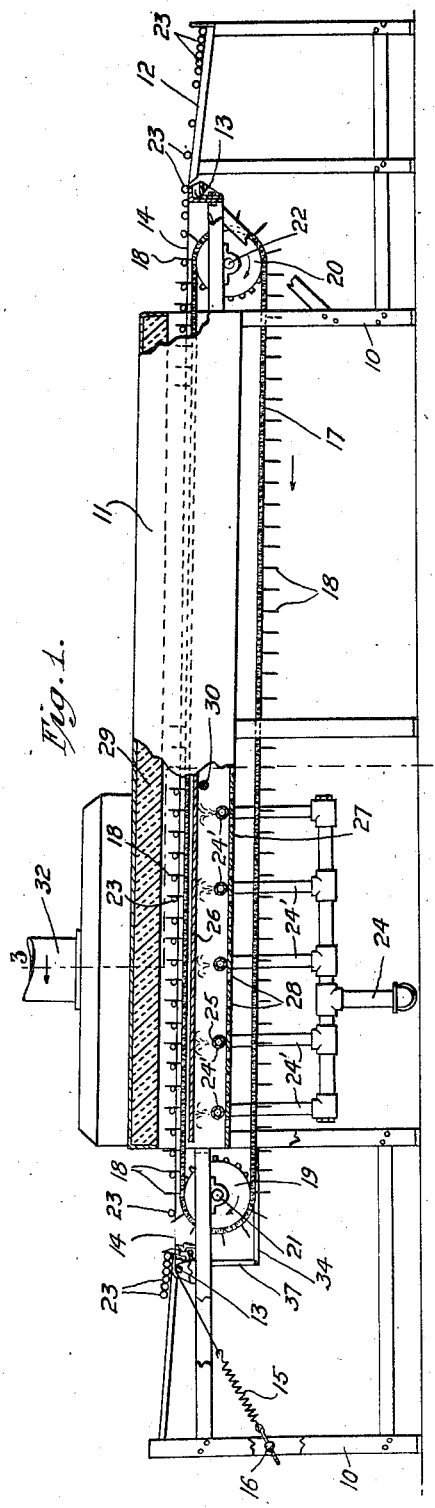
INVENTORS
Miles Pennybacker
Albert R. Hussey
BY
Roger Williams
ATTORNEY April 18, 1944.   M. PENNYBACKER ET AL   2,347,156
LEER FOR TUBING
Filed July 17, 1941   2 Sheets-Sheet 2
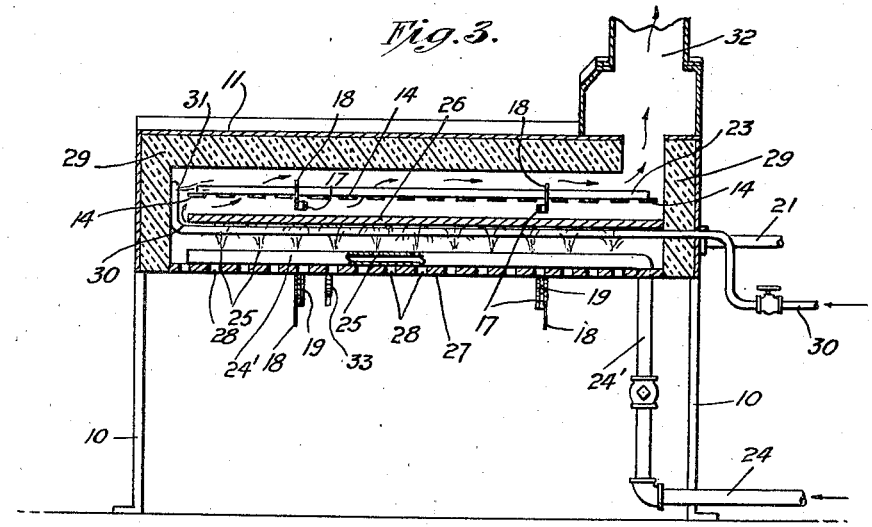
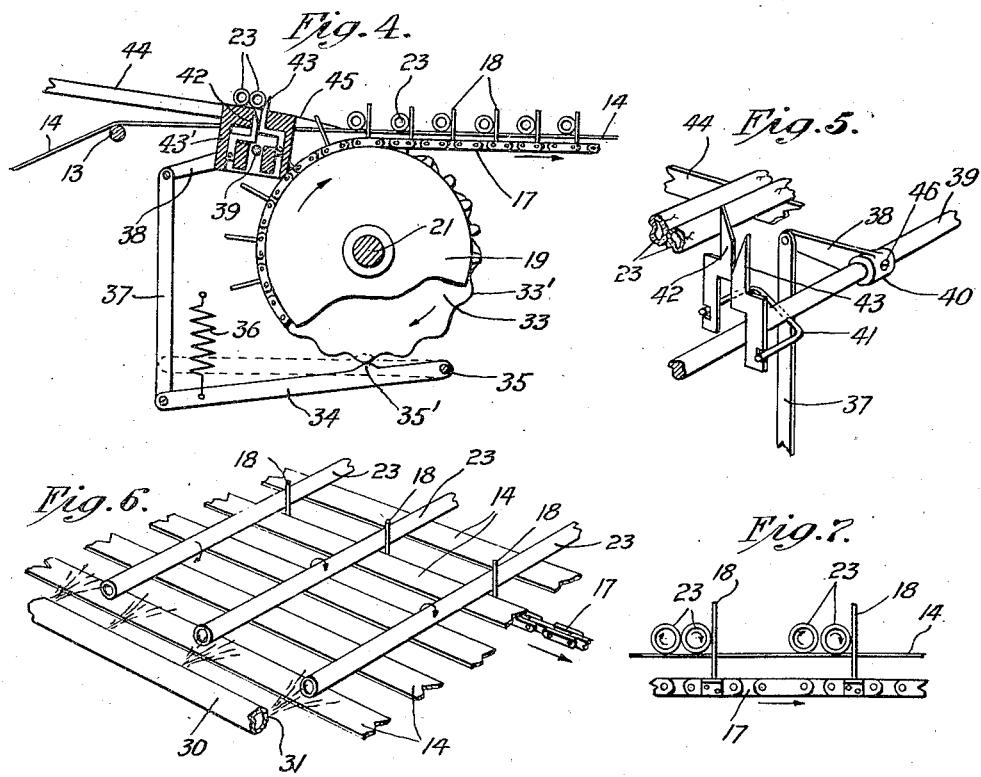
INVENTORS
Miles Pennybacker
Albert R. Hussey
BY
Roger Williams
ATTORNEY Patented Apr. 18, 1944

2,347,156

UNITED STATES PATENT OFFICE 2,347,156

LEHR FOR TUBING

Miles Pennybacker, West Orange, and Albert R. Hussey, Lyndhurst, N. J.; said Hussey assignor to said Pennybacker Application July 17, 1941, Serial No. 402,758

1 Claim. (Cl. 49—47)

This invention relates to a lehr for baking straightening and annealing tubing formed of vitreous material such as glass.

More particularly this invention relates to a lehr for baking glass tubing having a coating upon the inner walls thereof, for straightening lengths of such tubing and for annealing the tubing.

In connection with the employment of glass tubes for certain purposes, especially where such tubes are used to form the body of long tubular electric lamps of the so-called fluorescent type, provided with a base at each end for the purpose of making electric connections with the elements within the tubes, it has been found highly desirable that the tubes be of certain predetermined standard lengths, and that they be substantially straight, in order that the effective length be constant and so that the bases at the ends of the tubes will accurately engage sockets mounted at a fixed distance from one another, as in the case of fixtures designed to receive such tubes. Likewise the use of reflectors makes it desirable that the tubes be straight, for maximum efficiency of light distribution.

In connection especially with the production of lamps of the so-called fluorescent type, it is necessary to bake the internally coated tube at a comparatively high temperature in order to oxidize and remove certain decomposition products arising from the material employed for the coating, as well as other organic impurities which may be present within the tube. The high temperature necessary to effect this decomposition frequently causes the originally straight tube to become warped and likewise if an attempt is made to bake a number of tubes in contact with one another, this high temperature likewise frequently causes the tubes to stick or partially weld together at points where they are in contact with one another.

It has been proposed to rotate tubing while it is passing through a lehr. Attempts to have the tubing rotate solely by gravity, as by rolling down an inclined plane, have not been successful because of the fact that when the tube ceases to be perfectly straight as is the case when it warps, one tube will fail to roll by its own weight, and other tubes will then pack up behind the first tube, with consequent packing together of a mass of heated glass which will then almost invariably weld together and warp so badly that it will no longer be fit for use.

It has been proposed to keep tubes in rotation by means of an elaborate system of rollers, a length of tubing riding between each two sequential rollers. With a device of this character very elaborate mechanism is necessary in order to maintain such series of rollers in rotation and at the same time to move them forward from one end of the lehr to the other. Due to the high temperatures needed at one part of the lehr, for the oxidation or decomposition above referred to, lubrication and other mechanical problems involved when such a series of moving rollers are employed, present a very serious problem and necessitate very intricate mechanism of great cost.

One object of this invention is to provide a lehr for treating glass tubing which shall bake the interior coating of such tubing, which shall eliminate the products resulting from such decomposition and which shall anneal and straighten the tubing, all in a single passage through the lehr.

Another object of this invention is to provide a lehr for handling glass tubing which will maintain the tubing in constant rotation while passing therethrough, with a minimum of mechanical parts for simultaneously producing rotation and forward passage through the lehr.

A further object of this invention is to provide a drive and carrier system for passing glass tubing through a lehr, which will combine gravity feed with mechanical impulsion in such fashion that a minimum mechanical pressure will need to be exerted upon the tubing and consequently minimum interference with the free rotation of the tubing will take place.

A yet further purpose of this invention is to provide means for automatically feeding glass tubing of widely varying size into the carrier system of a lehr of the type above described.

Still another purpose of this invention is to combine with a lehr of the type described means for rapidly and efficiently removing from the interior of the tubing decomposition products produced therewithin by the action of heat upon a coating within the tubing, or upon organic materials which may be used in applying the coating and remain within the tube.

Other purposes of this invention will be apparent from a consideration of the drawings hereunto annexed, where:

Fig. 1 is a side elevation, partly in section, of a lehr according to this invention.

Fig. 2 is a plan view of the lehr partly broken away so as to show tubes passing therethrough.

Fig. 3 is a transverse section taken substantially on the lines 3—3 of Fig. 1.

Fig. 4 is an enlarged detail of the tube feeding mechanism.

Fig. 5 is a perspective view of certain portions of the tube feeding mechanism shown in Fig. 4.

Fig. 6 is a perspective view of tubes passing through the lehr, showing the method of ventilating the interior of the tube.

Fig. 7 is a detail of the carrier system, showing the means used to bring about combined movements of rotation and of translation of the tubes.

Referring now particularly to Figs. 1, 2 and 3, there is shown a generally supporting framework 10 which may conveniently be made of iron or other suitable material and which may be provided with a plurality of legs at various points along the length thereof. A large portion of the length of the lehr is enclosed by a suitable heat-insulated cover shown at 11. At the outlet end of the lehr is indicated a structure 12 consisting of an open framework having its upper surface suitably inclined so that the tubes leaving the lehr will roll down and be stacked up thereupon. This discharge and storage element constitutes no part of the present invention and accordingly no detailed description thereof is considered necessary.

Toward each end of the lehr, relatively strong metallic rods 13 extend from one side of the framework to the other. These may be formed of iron or other suitable material. Extending longitudinally of the lehr and stretched between rods 13 are flexible metal strips 14. These strips are formed of a material which will withstand the action of the most intensely heated portion of the oven, and which will maintain an adequately smooth surface finish, even under the action of such heat. Certain types of plated iron or alloys having these requirements are well known in the art. These strips 14 may be securely fastened to rod 13 at the output end of the lehr, and may extend beyond rod 13 at the input end, being fastened to points 16 of the framework through the intermediary of springs 15, which latter serve to take up the expansion of strips 14 under the influence of heat so as to maintain these strips at all times in a substantially flat plane, in order to furnish a smooth runway for the glass tubing.

Additional supports upon which these strips rest may be provided at intervals along the length of the oven in order to aid in reducing sag of the strips between the rods 13, 13. Such supports should keep the strips level with one another, transversely of the lehr, while a considerable degree of longitudinal sag is allowable. The framework 10 is designed so that rod 13 at the input end of the lehr is at a somewhat greater elevation than rod 13 at the output end. This results in the production of a substantially planar, inclined, and smooth surface extending from one end of the lehr to the other. This surface is, of course, traversed by longitudinal apertures constituted by the spaces between adjacent strips 14.

The carrier device is constituted by endless chain 17 which is provided with projecting pegs 18. It is understood that any other suitable mechanical device in the form of an endless belt may be employed in lieu of the chain here shown and described. Chain 17 passes over sprocket wheels 19 and 20 located at the respective ends of the chain. These sprockets may be mounted upon shafts 21 and 22. Either one or both of these shafts may be driven from any suitable source of mechanical energy. We have found it desirable to provide means for altering the rate of speed at which these shafts are driven, thus controlling and altering the speed with which glass tubes pass through the lehr. Such alteration is very desirable when tubing of varying sizes or composition is used, or when it is desirable to employ varying temperatures in the lehr.

The glass tubes to be treated, 23, are fed into the lehr by mechanism hereinafter to be described in detail and each tube takes up a position lying across the inclined plane formed by strips 14. Owing to the inclination of this plane, the tubes tend to roll by their own weight from the input end to the output end of the lehr. However, the upper portion of endless chain 17 lies directly beneath the space between two of the strips 14 situated toward one side of the lehr, so that pegs 18 project upward between these two strips. A similar carrier chain is shown, located toward the other side of the lehr. While we have shown two such chains, it is to be understood that a greater number may be employed if found desirable. All of these chains are preferably driven from sprockets of similar size, all the sprockets at one end being mounted upon a common shaft so as to secure uniformity of drive. The upper portion of chain 17 is preferably supported in a channel (not shown) so that it will not sag between the two sprockets and so that pegs 18 will at all points between the two ends of the lehr project through the interspaces between two adjacent strips 14. As evident in Fig. 1, each tube 23 is fed so that it lies between two sequential pegs 18 and these pegs serve to restrain and control the speed with which the tube passes through the lehr. We prefer to adjust the inclination of the inclined plane formed by strips 14 so that the tubes will be acted upon by gravity to an extent just sufficient to allow them to be held back by pegs 18 rather than be driven forward thereby, and we adjust this inclination so that a minimum degree of friction will exist between the tubes and the restraining pegs. However, in case that any tube is somewhat warped or if for any other reason a tube fails to roll forward at the proper speed under the force of gravity, it can be seen that the peg immediately following such tube will come up against it, and will push the tube forward through the oven. Even in case that such tube upon actual impulsion by the following peg, fails properly to rotate, yet the tube will be positively impelled forward in such fashion that it will not become impacted against the following tubes and surfaces of heated glass will not become packed together, as might happen in the absence of these pegs. This highly important action of our device brings it about that the failure of a single tube to progress readily will not entail damage to any other tubes which are in the lehr at the same time, a happening which is of frequent occurrence when gravity alone is employed as an impulsive force for the tubes. We do not limit ourselves, however, to the use of gravity as one force for impelling the tubes through the lehr, since carrier chain 17 may be arranged to be substantially horizontal, or if for any reason desirable it may even be elevated at the discharge end of the lehr. In either of these last two cases, the impelling action of the pegs 18 will constitute the sole force which impells the tube through the lehr.

For supplying the necessary heat for baking the tubes, we provide a main supply pipe 24 carrying a combustible fuel such as illuminating gas. Supply pipe 24 is arranged to feed a number of burner pipes $24^1$ branched off therefrom. These pipes rise a short distance and then extend across the lehr at a point located toward the feed end thereof, and constituting the hot zone thereof and at suitable points within the lehr are pierced with apertures 25, through which the fuel gas emerges and is subjected to combustion so as to heat a refractory baffle 26 lying above apertures 25. Part of the air for combustion of the gas enters the lehr through a lower enclosure plane member 27, of suitable material, provided with a plurality of apertures 28 for the admission of air therethrough. The remainder of the air needed for combustion is mixed and injected with the gas, so as to produce an efficient flame of the type well known in the art.

The top and sides of the lehr are preferably provided with a layer of heat insulating material 29, of any suitable type. The hottest portion of the lehr is near the entrance so that the tubes may be quickly raised to the maximum desired temperature and may slowly cool and anneal during their passage through the other portions of the lehr, to which no heat is directly applied.

In order to ventilate the interior of the tubes, we provide an additional supply of air, preferably filtered, through a pipe 30. This pipe extends sideways along the bottom of refractory baffle 26, so that the air flowing through the pipe will become heated. At the side opposite the point of entry, this pipe is extended longitudinally of the lehr and is provided with a plurality of openings 31, located so that air emerging therefrom will enter the open ends of the tubes 23 as they progress through the lehr. This ventilating action is shown in detail in Fig. 6. The air which has passed through the tubes and that which has passed around the exterior thereof, together with the waste products of combustion coming both from the gaseous fuel employed and from the decomposition or oxidation of coating binder within the tube, are all carried off by a flue 32 situated at the same side of the lehr through which the tube ventilating air supply enters.

It will be evident that the filtered air entering one side of the lehr will become progressively heated as it passes toward the other side of the lehr, and therefore the air emerging through apertures 31 will be comparatively highly heated, but at the same time will have its oxygen content not substantially reduced, so that such oxygen will be available within the interior of the coated tubes to aid in the combustion of organic binding materials, impurities, etc., which may be present within the tubes. The air which leaves the other end of the tube will carry with it such products of oxidation as may come from the tube and these products will be discharged on the side of the lehr where flue 32 will immediately carry them off. In some cases it may be useful to employ a single gas, such as oxygen, or a mixture of gases, other than air.

Referring now to Figs. 4 and 5 there is here shown in detail the mechanism for automatically feeding one tube at a time to the carrier chain 17. Mounted upon shaft 21 which carries the chain drive sprocket 19 is a cam 33 having smoothly contoured projections 33¹ of a number corresponding to the number of tubes which it is desired to feed for each single rotation of sprocket 19. A lever 34 mounted upon a pivot 35 is provided with a follower 35¹ which rides upon cam projections 33¹ and is given a reciprocating motion by the action of this revolving cam. A tension spring 36 tends to maintain lever 34 in contact with cam 33. Another connecting rod 37 is actuated by the free end of lever 34 and transmits the reciprocating motion thereof to a third lever 38. Lever 38 is fastened to a shaft 39 by any suitable means such as collar 40. A U-shaped member 41 is fastened to shaft 39 so as to partake of the oscillatory motion which is imparted to the shaft. Two flat members 42 and 43 of the shape shown are actuated reciprocatingly in a vertical sense by impulsion from the respective ends of member 41. All these parts are held in proper relation with one another by any suitable means such as a retaining frame 43¹. Another U-shaped member with other feeding members, similar to the assembly just described is preferably mounted on shaft 39, near the other end, so that a tube will be controlled with respect to feed at two points.

The glass tubes 23 are placed upon an inclined plane 44 which is alternately terminated at its lower extremity by members 42 and 43, one member rising while the other is falling. When member 43 rises above plane 44, a tube 23 will roll down by gravity until it rests against this member. As member 43 sinks down below the level of the plane 44, the tube which was restrained thereby will roll down a delivery plane 45, terminating at the level of carrier chain 17. While this is happening, the remaining tubes are restrained from forward motion by the action of element 42. As element 42 sinks down and element 43 again rises, the next tube will in turn roll forward until restrained by element 43. In this way it can be seen that the reciprocating motion of these elements causes the feeding of one tube at a time onto carrier chain 17. Due to the formation of the upper ends of members 42 and 43 with sloping surfaces, it has been found possible to feed tubes of diameters varying from one another in a ratio at least as great as 1:3.

Figure 7 shows in detail carrier chain 17 with pegs 18 enclosing two tubes between adjacent pegs. We have found it possible, especially in the case of tubes of small diameters, to handle such tubes as here indicated, that is with more than one tube being restrained by a single peg 18. The tubes will rotate in the directions indicated by the arrows and otherwise will pass through the lehr in the same fashion as above described for a single tube. In order to secure the admittance of two tubes into a single space upon carrier chain 17 bounded by two pegs, it is necessary for the feeding mechanism shown in Figs. 4 and 5 to operate at twice the speed necessary to feed a single tube in the same length of time. This may readily be secured by forming cam 33 with twice as many projections as are necessary for the feeding of one tube per peg of the carrier chain. Of course, it is possible to provide a plurality of cams arranged to bring about a greater or lesser number of feeding operations per unit time and to actuate shaft 39 by selecting a cam having the desired number of projections to operate the same. For example, collar 40 may be provided with a coupling screw 46 which can be loosened if so desired, and other cams and other motion transfer mechanisms actuated thereby may be coupled to other similar collars located at various points along shaft 39. Alternately other well-known mechanical expedients may be employed to accomplish the selection of the desired ratio of cyclic operation of the feed mechanism with respect to the traverse speed of chain 17.

While we have shown and described one embodiment of our invention, it will be evident to those skilled in the art that many elements here shown may be varied without departing from the spirit of this invention. For example, the width of the flat strips 14 may be greatly reduced, or even wires may be used. Likewise other methods of supplying heat to the lehr may be used and the ventilating air employed to clear out the interior of the glass tubes may be supplied in any other suitable fashion or may be omitted, if the tubes contain only a small amount of organic matter.

It is possible to use our lehr with tubes in which any volatile ingredients used in coating are not yet fully dried, as such ingredients will be removed during the baking and by the ventilating air used in the lehr.

We claim:

A lehr for treating tubing including a conveyor including a plurality of flexible strips, means for supporting and maintaining said strips in a plane approaching the horizontal, a carrier chain situated directly beneath said strips, pegs mounted upon and carried by said chain and projecting upwardly between two adjacent strips, means for moving said chain and the pegs carried thereby in a direction corresponding to the longitudinal extension of said strips, and means for feeding each tube upon said strips so as to lie between two adjacent pegs, whereby said tube is propelled through said lehr by said carrier chain and pegs, said elongated strips being supported and maintained in a downwardly sloping plane, whereby each tube barely tends to roll along said strips and is controlled as to speed of progress through the lehr by the action of the pegs, said lehr also including means for blowing a gas through the tubes as they move laterally through the lehr, said gas blowing means including a series of stationary nozzles past which the tubes are successively laterally translated.

MILES PENNYBACKER.
ALBERT R. HUSSEY.